(12) United States Patent
Parry

(10) Patent No.: US 7,319,682 B2
(45) Date of Patent: Jan. 15, 2008

(54) METHODS AND APPARATUS FOR SELECTING A WIRELESS LOCAL AREA NETWORK PORT AND ESTABLISHING COMMUNICATION THEREWITH

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1066 days.

(21) Appl. No.: 10/040,553

(22) Filed: Jan. 7, 2002

(65) Prior Publication Data

US 2003/0128682 A1 Jul. 10, 2003

(51) Int. Cl.
*H04Q 7/20* (2006.01)
*H04L 12/28* (2006.01)
*H04L 12/66* (2006.01)

(52) U.S. Cl. .................. 370/332; 370/338; 370/395.2; 370/401; 370/465; 455/426.2; 455/436

(58) Field of Classification Search ................ 370/338, 370/908, 395.2, 395.53, 332, 401, 465; 455/426.2, 455/436
See application file for complete search history.

(56) References Cited

U.S. PATENT DOCUMENTS

| | | | | |
|---|---|---|---|---|
| 5,539,744 A * | 7/1996 | Chu et al. | .................... | 370/397 |
| 5,570,366 A * | 10/1996 | Baker et al. | ................. | 370/312 |
| 5,633,868 A * | 5/1997 | Baldwin et al. | ............. | 370/331 |
| 5,781,538 A * | 7/1998 | Ganesan et al. | ............ | 370/310 |
| 5,812,951 A * | 9/1998 | Ganesan et al. | ............ | 455/445 |
| 5,815,811 A * | 9/1998 | Pinard et al. | ................ | 455/434 |
| 5,901,362 A * | 5/1999 | Cheung et al. | ............. | 455/525 |
| 6,151,645 A * | 11/2000 | Young et al. | ................. | 710/63 |
| 6,353,599 B1 * | 3/2002 | Bi et al. | ...................... | 370/328 |
| 6,580,700 B1 * | 6/2003 | Pinard et al. | ................ | 370/332 |
| 6,725,303 B1 * | 4/2004 | Hoguta et al. | .............. | 710/106 |
| 2001/0054060 A1 * | 12/2001 | Fillebrown et al. | ......... | 709/201 |
| 2002/0007407 A1 * | 1/2002 | Klein | ......................... | 709/225 |
| 2002/0058480 A1 * | 5/2002 | Ikeda | ......................... | 455/67.1 |
| 2002/0091843 A1 * | 7/2002 | Vaid | ........................... | 709/230 |
| 2002/0118657 A1 * | 8/2002 | Winchell et al. | ............ | 370/329 |
| 2002/0146980 A1 * | 10/2002 | Solondz et al. | ............... | 455/21 |
| 2002/0159418 A1 * | 10/2002 | Rudnick et al. | ............ | 370/338 |
| 2003/0051052 A1 * | 3/2003 | Shteyn et al. | ................ | 709/245 |
| 2003/0058808 A1 * | 3/2003 | Eaton et al. | ................. | 370/310 |
| 2003/0061397 A1 * | 3/2003 | Jacobs et al. | ............... | 709/314 |
| 2003/0081583 A1 * | 5/2003 | Kowalski | ..................... | 370/338 |
| 2003/0118015 A1 * | 6/2003 | Gunnarsson et al. | ........ | 370/389 |
| 2003/0125057 A1 * | 7/2003 | Pesola | ......................... | 455/502 |
| 2004/0047320 A1 * | 3/2004 | Eglin | .......................... | 370/338 |
| 2004/0193675 A1 * | 9/2004 | Fillebrown et al. | ......... | 709/203 |
| 2005/0002346 A1 * | 1/2005 | Bichot | ......................... | 370/312 |

* cited by examiner

*Primary Examiner*—Alpus H. Hsu

(57) ABSTRACT

A method for wirelessly connecting a workstation, such as a computer, to a local area network includes selecting a LAN with which the workstation is to communicate. A wireless LAN access device that communicates with a processor of the workstation receives signals broadcast by wireless LAN ports. The signals are evaluated to identify those signals which originated from wireless LAN ports of the selected LAN. A connection protocol is then selected, based on a signal from one of the wireless LAN ports of the selected LAN, to establish a connection and, thus, communication between the wireless LAN access device of the workstation and that wireless LAN port. If such communication is established, one or more security identifiers may be provided from the workstation to the selected LAN. A connection program, which is embodied as instructions on one or more storage media, may be used to effect the method.

19 Claims, 3 Drawing Sheets

METHODS AND APPARATUS FOR SELECTING A WIRELESS LOCAL AREA NETWORK PORT AND ESTABLISHING COMMUNICATION THEREWITH

BACKGROUND OF THE INVENTION

1. Field of the Invention

The present invention relates generally to client manager programs for use with wireless local area network (LAN) access devices and, more specifically, to client manager programs that facilitate automatic connection by wireless LAN access devices to wireless ports of LANs which require different security identifiers or different connection protocols, or to wireless ports of different LANs. In particular, the present invention relates to client manager programs that automatically initiate communication of a wireless LAN access device with a plurality of different, predetermined wireless LAN ports.

2. Background of Related Art

In the state of the art, computers are becoming increasingly portable. As such, computers are often used in a variety of different locations. Conventionally, computers have communicated with various external accessories, other computers, computer networks, and the like by way of so-called "hard connections," such as wires. The use of conventional hard connections is, however, somewhat undesirable, as the time required to connect two or more devices, as well as the physical connections between devices, diminish the portability of state of the art computers.

To further increase portability, wireless type communication ports have been developed. A wireless communication port of a first device, such as a computer, may communicate with a wireless communication port of one or more other devices, such as printers, scanners, other computers, and the ports of various types of networks.

An exemplary type of wireless communication device is a wireless LAN access device, which facilitates communication between a portable computer and a wireless port of a LAN. By way of example, a wireless LAN access device of a portable computer may be linked with a LAN by way of a single wireless communication port or by a number of different, complementary wireless ports at a variety of locations. Each such wireless LAN port is hard-linked (e.g., by wiring) to the LAN. The wireless LAN access device of a computer may, in turn, communicate with a specific type of wireless LAN port by way of electromagnetic (e.g., infrared (IR), radiofrequency (RF), etc.) signals.

Typically, a computer includes a client manager program stored in memory thereof for each type of external device with which the computer may wirelessly connect or otherwise communicate. Thus, a separate client manager program is typically required for each type of wireless communication port with which the computer is configured to connect. In order to establish wireless communication between a wireless LAN access device of a computer and a wireless LAN port of a particular LAN, a specific client manager program must be executed to initiate a connection protocol acceptable to the wireless LAN port. Thus, the user of a portable computer must be able to identify the wireless communication port through which a connection to the specified LAN will be made, then select the appropriate client manager program.

As a single LAN may include a number of different types of wireless LAN ports, a user may be required to choose, from a number of different client manager programs, the appropraite client manager program for establishing a wireless connection with a particular wireless LAN port of the LAN to which access is desired. If the wireless LAN ports with which the computer can communicate are not readily visible, the process of selecting the appropriate client manager may be one of trial-and-error, wasting the computer user's time.

Once a communication link has been established between a computer and a particular wireless LAN port, one or more security identifiers (e.g., user names, passwords, etc.) may be required to provide the computer with access to the LAN.

Accordingly, there is a need for a wireless connection program that facilitates access to computer networks by way of wireless communication ports at a variety of different locations without requiring a computer user to select and employ a specific client manager for each individual location.

SUMMARY OF THE INVENTION

The present invention includes a connection program that selects an appropriate connection protocol for establishing communication between a workstation and a LAN. The connection protocol may be selected based upon a signal broadcast by a wireless LAN port, which is also referred to herein as a "wireless port", of the LAN and received by a wireless LAN access device, which is also referred to herein as a "wireless network access device", of a workstation, such as a portable computer or a desktop computer. Communication between the workstation and the LAN may be effected through the respective wireless LAN access device and signal-broadcasting wireless LAN port.

Upon identification and selection, by a workstation user, of a LAN with which communication is desired, which is referred to herein as a "selected LAN", a connection program according to the present invention may first cause a processor of the workstation to instruct a wireless LAN access device associated with the same workstation to attempt to communicate with, or link to, a specific wireless LAN port of a particular LAN. If no such communication is established, the connection program may then cause the processor to instruct the wireless LAN access device to search for signals, typically in the form of radiofrequency (RF), infrared (IR), or other types of electromagnetic radiation, being broadcast by nearby wireless LAN ports to the selected LAN.

A wireless LAN port typically broadcasts an identifier signal, which includes information about the type of connection protocol required to establish communication therewith, as well as identifying information about the LAN of which the wireless LAN port is a part. Different wireless communication ports that are located within the same general area may provide an authorized user with access to the same LAN but operate under different connection protocols. Alternatively, different, proximately located wireless communication ports may provide authorized users with access to different LANs.

Any identifier signals that are detected by a wireless LAN access device and received therethrough by a workstation may be compared, by the processor of the workstation, with a list of wireless LAN ports and/or a list of LANs, which are typically stored in memory associated with the workstation (e.g., a hard drive, random access memory (RAM), a compact disk-read-only memory (CD-ROM), a floppy disk, etc.), with which the workstation has been configured to communicate. When the identifier of a signal-broadcasting wireless LAN port and the identifier of the LAN to which the wireless LAN port is connected match the identifier for the selected LAN and an identifier for a type of wireless LAN port with which the workstation is configured to communicate, the connection program of the present invention may operate a connection protocol that is appropriate for use with that signal-broadcasting wireless LAN port.

In the event that the wireless LAN access device of a workstation detects a number of signals broadcast by different wireless LAN ports, the connection program of the present invention may cause a processor of the workstation to evaluate one or more characteristics of each of the signals. Based on this evaluation, the processor may then, under control of the connection program, select a wireless LAN port with which communication is to be established. By way of example, a wireless LAN port may be selected when the processor, under control of the connection program, determines that the workstation is configured to communicate with the selected LAN through a particular wireless LAN port based on the identifier signal broadcast by that wireless LAN port. If it is determined that the workstation is configured to establish communication with more than one of the signal-broadcasting wireless LAN ports, the signals may then be evaluated on the basis of one or more of their strength, clarity (i.e., lack of noise), etc., with the wireless LAN port that broadcasts the "best" (e.g., strongest, clearest, etc.) signal being selected.

In an exemplary embodiment of the invention, the connection program comprises a client manager that is itself configured to establish communication with one or more wireless LAN ports or with one or more LANs. Once a particular wireless LAN port has been identified and selected by the connection program, the client manager initiates a connection protocol appropriate for the selected wireless LAN port and provides any security identifiers that are required for gaining access to the LAN of which the selected wireless LAN port is a part.

Another exemplary embodiment of connection program according to the present invention is stored and executed separately from each of the client managers stored in memory of the workstation. Once a processor of the workstation, under control of such a connection program, has identified and selected a wireless LAN port through which communication with a LAN will be established, the connection program causes the processor to select and execute a client manager appropriate for communicating with the selected wireless LAN port and for gaining access to the LAN of which the selected wireless LAN port is a part.

If communication cannot be established between the wireless LAN access device of a workstation and the selected wireless LAN port, the remaining detected signals may be evaluated and another wireless port of the selected LAN may be chosen on the basis of the signal broadcast thereby. An attempt may then be made to establish communication between the wireless LAN access device of the workstation and the newly selected wireless LAN port, as described above. This process may be repeated until all of the detected signals have been evaluated. In the event that no connection is established between the workstation and a nearby wireless LAN port, all of the signals may again be evaluated, or the workstation may be moved to a location in proximity to different wireless LAN ports.

Other features and advantages of the present invention will become apparent to those of ordinary skill in the art through consideration of the ensuing description, the accompanying drawings, and the appended claims.

BRIEF DESCRIPTION OF THE DRAWINGS

In the figures, which illustrate various aspects of exemplary embodiments of the present invention.

DETAILED DESCRIPTION

Figure 1:
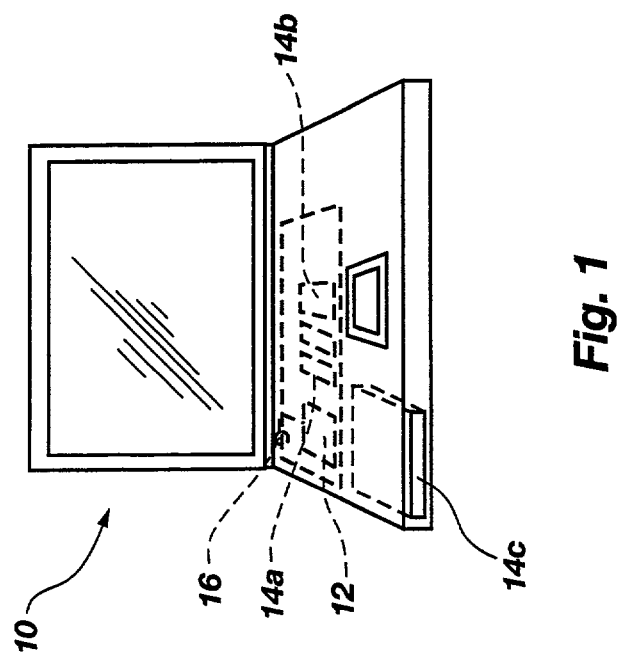
FIG. 1 is a schematic representation of an exemplary workstation with which the wireless connection method and program of the present invention may be used.

With reference to FIG. 1, a workstation 10 is depicted. In addition to a processor 12 and memory 14, such as the random access memory (RAM) 14a, the one or more hard disks 14b, and the one or more disk drives 14c, that are typically associated with computers, workstation 10 also includes a wireless LAN access device 16 which is in communication with processor 12. One or more connection programs may be stored, as information in the form of digital data, by one or more storage media, such as memory 14 (e.g., on a hard drive 14b), until needed.

Figure 2:
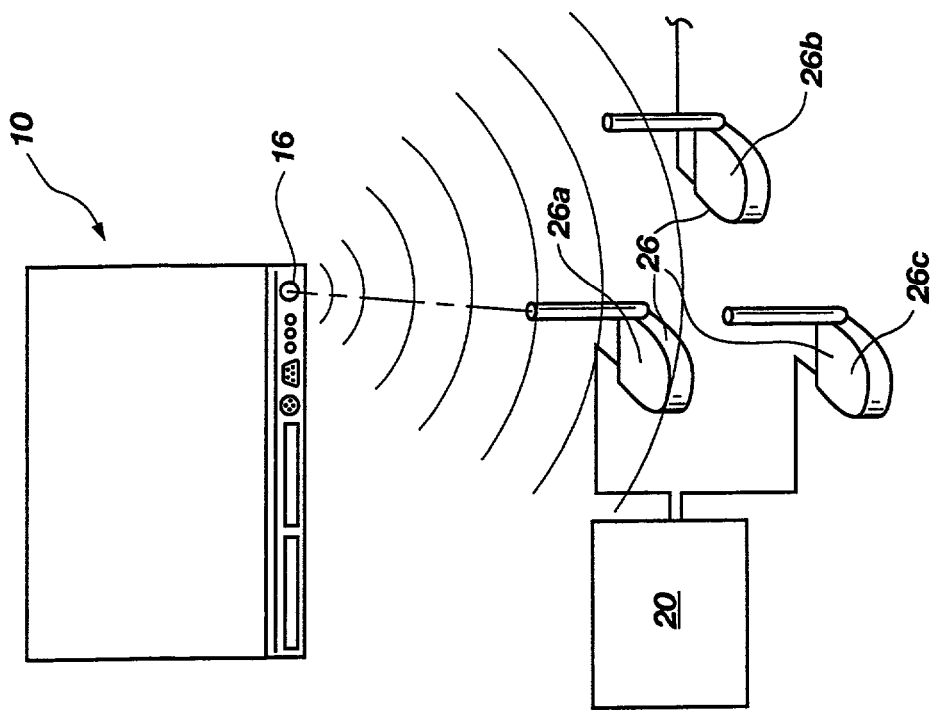
FIG. 2 schematically depicts the wireless connection of a workstation to a selected LAN.

In one embodiment of the present invention, the connection program is a client manager program that may cause workstation 10, through wireless LAN access device 16, to communicate with at least one LAN 20, shown in FIG. 2, by way of a number of different connection protocols (e.g., TCP/IP, IPX/SPX, NetBEUI, etc.) and by providing security identifiers (e.g., a user name, a password, a workstation identifier, etc.) that are specific to the selected LAN 20 and, possibly, to a particular wireless LAN port 26 through which such communication is desired.

In another embodiment of the present invention, the connection program is configured to select an appropriate, separate client manager program from memory 14. The separate client manager program, in turn, facilitates connection of workstation 10 to LAN 20 through wireless LAN access device 16 by providing a connection protocol appropriate for connection to a particular wireless LAN port 26, as well as the necessary security identifiers for obtaining access to LAN 20 once a connection therewith has been established.

Figure 3:
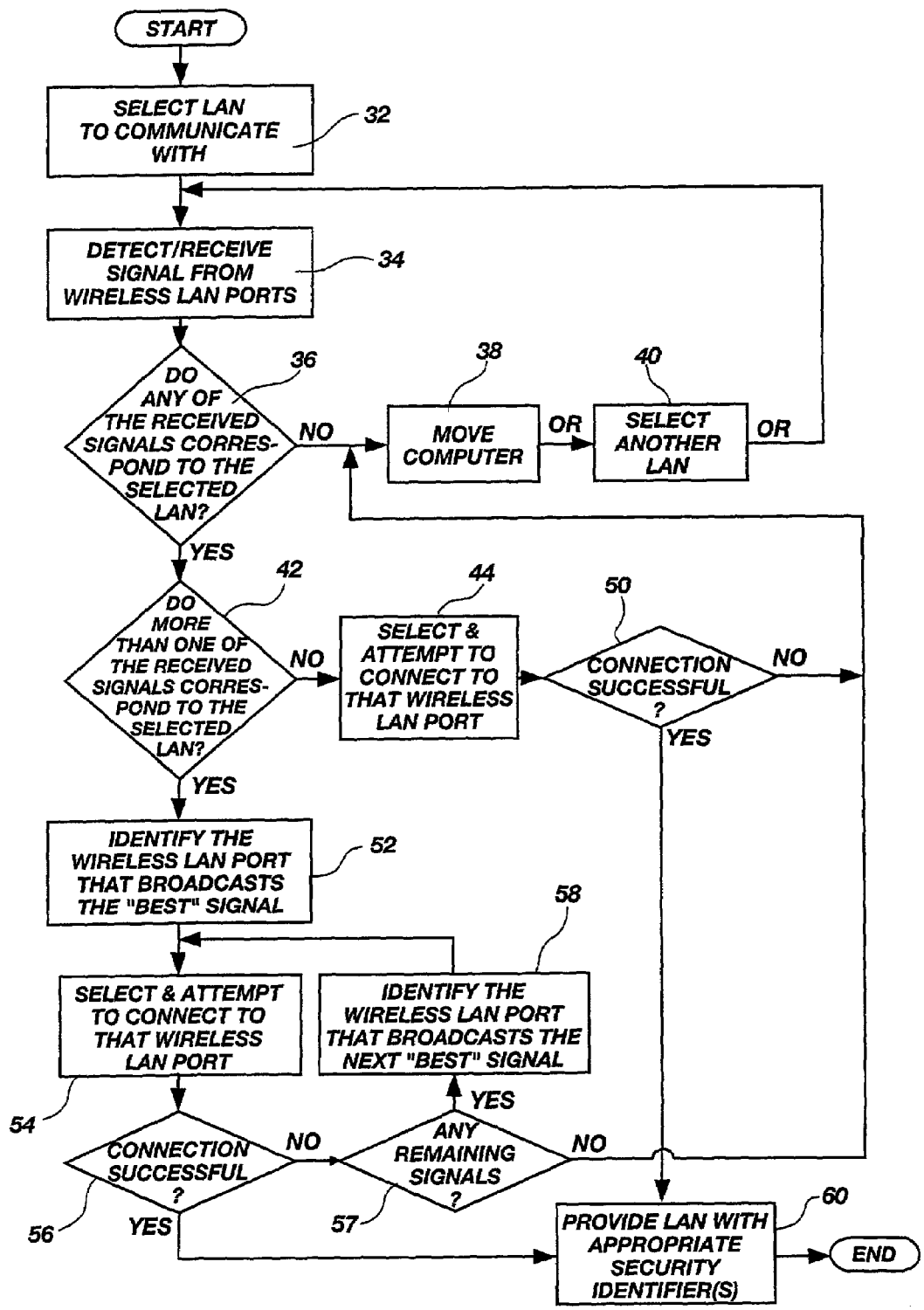
FIG. 3 is a flow chart depicting the method of the present invention.

With continued reference to the schematic representations of FIGS. 1 and 2, as well as to the flow chart of FIG. 3, when a user of workstation 10 desires to access a particular LAN 20, the user may, at reference character 32 of FIG. 3, select a LAN with which communication is desired. By selecting a LAN in this manner, processor 12 of workstation 10 accesses an appropriate connection program according to the present invention from memory 14 and executes the connection program.

Optionally, the connection program may attempt to use the most recently employed connection protocol to connect to the selected LAN 20. In the event that such an attempt to connect with the selected LAN 20 is not successful, or if this option is not empolyed, process flows to reference character 34 of FIG. 3.

Upon being executed, the connection program instructs processor 12, at reference character 34 of FIG. 3, to cause wireless LAN access device 16 to detect and receive any signals that are being broadcast by nearby wireless LAN ports 26a, 26b, 26c (collectively referred to as "wireless LAN ports 26"). These signals, which include data about the identity of the type of wireless LAN port 26 by which the signals are broadcast and data about the identity of the particular LAN to which wireless LAN port 26 provides access, may be digitized and communicated to processor 12, as known in the art.

In the event that wireless LAN access device 16 of workstation 10 does not receive any signals from a wireless LAN port 26, as shown at reference character 36 of FIG. 3, workstation 10 may be moved to another location, as indicated at reference character 38 of FIG. 3, or the user may select another LAN for workstation 10 to communicate with, as shown at reference character 40 of FIG. 3.

Process similarly flows to reference character 38 or reference character 40 of FIG. 3 if processor 12, under control of the connection program, determines from digitized signals communicated thereto by wireless LAN access device 16 that the signals received by wireless LAN access device 16 were not broadcast by a wireless LAN port 26 to the selected LAN 20.

When, on the other hand, the digital signals that are communicated to processor 12 by wireless LAN access device 16 indicate that the signals received by wireless LAN access device 16 did originate from a wireless LAN port 26 of the selected LAN 20, process flows to reference character 42 of FIG. 3.

At reference character 42 of FIG. 3, processor 12 evaluates the digitized signals communicated thereto by wireless LAN access device 16 to determine whether or not more than one of the evaluated, digitized signals corresponds to a signal that has been broadcast by a wireless LAN port 26 of the selected LAN 20.

A Single Signal is Detected that Corresponds to the Selected LAN

Figure 4:
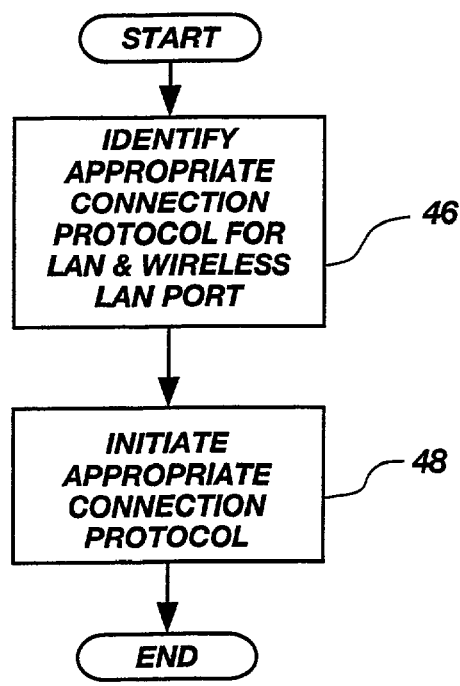
FIG. 4 is a flow chart illustrating the selection of an appropriate connection protocol by a first embodiment of connection program according to the present invention, in which the connection program comprises a single client manager program.
Figure 5:
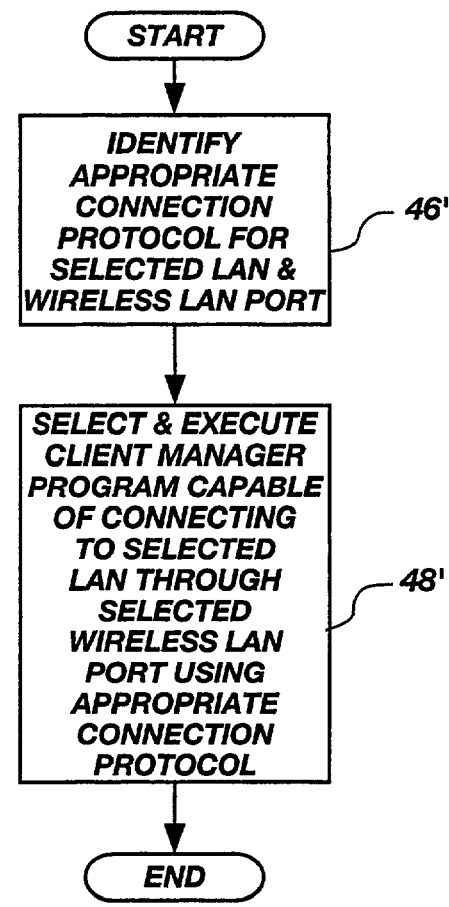
FIG. 5 is a flow chart that illustrates the selection of an appropriate client manager by a second embodiment of connection program of the present invention, in which the connection program is distinct from client manager programs that facilitate the connection of a workstation to a selected LAN.

If, at reference character 42 of FIG. 3, it is determined that only one evaluated, digitized signal corresponds to a signal broadcast by a wireless LAN port of the selected LAN 20, process flows to reference character 44 of FIG. 3, where an attempt is made to connect to selected LAN 20 through wireless LAN port 26. FIGS. 4 and 5 are flow charts that illustrate different embodiments of the manner in which the connection program may attempt to connect with the selected LAN 20 through wireless LAN port 26.

In FIG. 4, the connection program may itself, at reference character 46, cause processor 12 (FIG. 1) to identify a connection protocol appropriate for establishing a connection with wireless LAN port 26 (FIG. 2). At reference character 48, the connection program causes processor 12 to initiate the identified connection protocol.

In FIG. 5, the connection program may, at reference character 46', cause processor 12 (FIG. 1) of workstation 10 to identify a connection protocol appropriate for the type of wireless LAN port 26 (FIG. 2) that has been detected. Next, at reference character 48', processor 12, under instructions from the connection program, selects and executes a client manager that corresponds to the selected LAN 20 and which is capable of operating the appropriate connection protocol for establishing a connection between wireless LAN access device 16 of workstation 10 and wireless LAN port 26 of LAN 20.

Process then flows from either reference character 48 of FIG. 4 or reference character 48' of FIG. 5 to reference character 50 of FIG. 3. With returned reference to FIGS. 1-3, processor 12 of workstation 10 inquires, at reference character 50 of FIG. 3, as to whether or not a connection has been established between wireless LAN access device 16 of workstation 10 and wireless LAN port 26 of the selected LAN 20.

If no connection is made, process flows to reference character 38 of FIG. 3, where workstation 10 is moved to a new location, or to reference character 40 of FIG. 3, at which the user of workstation 10 may select another LAN with which workstation 10 may attempt to establish communication.

If, in the alternative, a connection is successfully established between wireless LAN access device 16 of workstation 10 and wireless LAN port 26 of the selected LAN 20, process flows to reference character 60 of FIG. 3, where the connection program or a selected client manager program causes processor 12 to supply the selected LAN 20, through wireless LAN access device 16 and wireless LAN port 26, with one or more appropriate security identifiers, such as a user name and/or a password. Such security identifiers may be automatically supplied by processor 12 to the selected LAN 20, or processor 12 may require a user of workstation 10 to supply any required security identifiers prior to requesting access to the selected LAN 20. Of course, if the security identifiers are recognized by the selected LAN 20, workstation 10 (and a user thereof) may be granted access to selected LAN 20.

Multiple Signals are Detected that Correspond to the Selected LAN

When it is determined, at reference character 42 of FIG. 3, that signals from more than one wireless LAN port 26 of the selected LAN 20 have been detected by wireless LAN access device 16, process flows to reference character 52 of FIG. 3.

At reference character 52, processor 12 of workstation 10, under instructions from the connection program, evaluates each of the signals that have been received by wireless LAN access device 16 which correspond to wireless LAN ports 26 of the selected LAN 20. Of these signals, the "best" signal and its source are identified by processor 12. Processor 12, again under control of the connection program, determines the "best" signal by evaluating one or more characteristics of each of the signals that have been broadcast by wireless LAN ports 26 of the selected LAN 20 and which have been received by wireless LAN access device 16 of workstation 10. By way of example only, processor 12 may evaluate one or both of the strength and clarity of the signals that have been received by wireless LAN access device 16. Once processor 12 has identified the "best" signal, the connection program causes processor 12 to identify the wireless LAN port 26 from which the "best" signal originated.

Next, at reference character 54 of FIG. 3, processor 12, pursuant to instructions from the connection program, selects the wireless LAN port 26 that broadcast the "best" signal and causes wireless LAN access device 16 of workstation 10 to attempt to establish a connection and, thus, communication with that wireless LAN port 26. The flow charts of FIGS. 4 and 5 illustrate different embodiments of the manner in which the connection program may attempt to connect with the selected LAN 20 through a selected wireless LAN port 26.

Referring again to FIG. 4, the connection program may itself, at reference character 46, cause processor 12 (FIG. 1) to identify a connection protocol appropriate for establishing a connection with the selected wireless LAN port 26 (FIG. 2). At reference character 48, the connection program causes processor 12 to initiate the identified connection protocol.

In FIG. 5, the connection program may, at reference character 46', cause processor 12 (FIG. 1) of workstation 10 to identify a connection protocol appropriate for the type of wireless LAN port 26 (FIG. 2) that has been detected and selected. Next, at reference character 48', processor 12, under instructions from the connection program, selects and executes a client manager that corresponds to the selected LAN 20 and which is capable of operating the appropriate connection protocol for establishing a connection between wireless LAN access device 16 of workstation 10 and wireless LAN port 26 of LAN 20.

Once the process of reference character 54 of FIG. 3 is complete, process flows from reference character 48 of FIG. 4 or from reference character 48' of FIG. 5 to reference character 56 of FIG. 3. Returning reference again to FIGS. 1-3, processor 12 of workstation 10 inquires, at reference character 56 of FIG. 3, as to whether or not a connection has been established between wireless LAN access device 16 of workstation 10 and wireless LAN port 26 of the selected LAN 20. If no connection is made, process flows to reference character 57 of FIG. 3. At reference character 57, a determination is made by processor 12, under control of the connection program, if any other signals that have been broadcast by one or more other wireless LAN ports 26 of the selected LAN 20 are still being received by wireless LAN access device 16 of workstation 10.

If no other signals from wireless LAN ports 26 of the selected LAN are being detected by wireless LAN access device 16 of workstation 10, process flows to reference character 38 of FIG. 3, where workstation 10 is moved to a new location, or to reference character 40 of FIG. 3, at which the user of workstation 10 may select another LAN with which workstation 10 may attempt to establish communication. If, however, wireless LAN access device 16 of workstation 10 is detecting one or more other signals that are being broadcast by a wireless LAN port 26 of the selected LAN 20, process flows to reference character 58 of FIG. 3.

At reference character 58, the connection program causes processor 12 to again evaluate each remaining, received signal being broadcast by a wireless LAN port 26 of the selected LAN 20. The next-"best" signal is determined, as described previously herein, and the wireless LAN port 26 from which that signal originated is identified.

Process then flows back to reference character 54 of FIG. 3, where processor 12 selects the wireless LAN port 26 that broadcast the next-"best" signal and causes wireless LAN access device 16 of workstation 10 to attempt to communicate with that wireless LAN port 26.

The processes depicted at reference characters 54, 56, 57, and 58 are repeated until it is determined, at reference character 56, that a connection and, thus, communication are successfully established between wireless LAN access device 16 of workstation 10 and wireless LAN port 26 of the selected LAN 20, or until every signal that has been broadcast by the wireless LAN ports 26 of the selected LAN 20 have been evaluated and attempts have been made by processor 12 of workstation 10 to connect wireless LAN access device 16 thereof with those wireless LAN ports 26.

Once a successful connection is established between wireless LAN access device 16 of workstation 10 and wireless LAN port 26 of the selected LAN 20, process flows from reference character 56 of FIG. 3 to reference character 60 of FIG. 3.

At reference character 60 of FIG. 3, the connection program or a selected client manager program instructs processor 12 to supply the selected LAN 20, through wireless LAN access device 16 and wireless LAN port 26, with one or more appropriate security identifiers, such as a user name, a password, a computer identifier, another identifier, or some combination thereof. Such security identifiers may be automatically supplied by processor 12 to the selected LAN 20, or processor 12 may require a user of workstation 10 to supply any required security identifiers prior to requesting access to the selected LAN 20. Of course, if the security identifiers are recognized by the selected LAN 20, workstation 10 may be granted access to selected LAN 20.

Although the foregoing description contains many specifics, these should not be construed as limiting the scope of the present invention, but merely as providing illustrations of some exemplary embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. A method for establishing wireless communication between a computer and a local area network, comprising:
   receiving a signal broadcast by at least one wireless port of the local area network;
   evaluating said signal to determine a connection protocol type of said at least one wireless port;
   initiating a connection protocol based on said connection protocol type of said at least one wireless port;
   receiving another signal from another wireless port of the local area network;
   evaluating said another signal to determine a connection protocol type of said another wireless port;
   initiating a connection protocol based on said connection protocol type of said another wireless port; and
   attempting to establish a connection between the computer and said another wireless port by way of said connection protocol when said attempting to establish said connection between the computer and said at least one wireless port is not completed.

2. The method of claim 1, further comprising:
   receiving signals broadcast by a plurality of wireless ports of the local area network; and
   selecting one of said signals.

3. The method of claim 2, wherein said evaluating said signal comprises evaluating said selected signal.

4. The method of claim 2, wherein said selecting comprises selecting one of said signals based on at least one of a strength and a clarity thereof.

5. The method of claim 1, further comprising:
   attempting to establish a connection between the computer and said at least one wireless port by way of said connection protocol.

6. The method of claim 5, further comprising:
providing the local area network with at least one security identifier upon completion of said establishing said connection.

7. The method of claim 5, further comprising:
selecting another local area network with which to connect the computer when said connection between the computer and said at least one wireless port is not established using said connection protocol.

8. The method of claim 1, wherein said receiving said another signal comprises moving the computer to another location.

9. A method for selecting a connection protocol to be used to wirelessly connect a computer to a local area network, comprising:
receiving at least one signal;
determining whether said at least one signal is being broadcast by a wireless port of the local area network;
evaluating said at least one signal to determine a connection protocol type of said wireless port by which said at least one signal is being broadcast; and
if said at least one signal is being broadcast by a wireless port of the local area network, initiating a connection protocol that is compatible with said wireless ports;
receiving another signal from another wireless port of the local area network;
evaluating said another signal to determine a connection protocol type of said another wireless port; and
initiating a connection protocol based on said connection protocol type of said another wireless port.

10. The method of claim 9, wherein said determining comprises determining that a plurality of received signals are being broadcast by wireless ports of the local area network.

11. The method of claim 10, further comprising:
selecting one of said plurality of received signals.

12. The method of claim 11, wherein said selecting comprises:
evaluating at least one of a strength and a clarity of each of said plurality of received signals.

13. The method of claim 11, wherein said initiating comprises attempting to establish communication with a wireless port by which said selected signal is being broadcast.

14. A workstation configured to select a connection protocol for establishing wireless communication with a local area network, comprising:
at least one processor;
at least one wireless network access device in communication with said at least one processor; and
at least one storage medium configured to communicate with said at least one processor, said at least one storage medium comprising instructions stored in data format for:
causing said at least one wireless network access device to receive at least one signal being broadcast by a wireless port of the local area network and to communicate said at least one signal to said at least one processor in a format recognizable by said at least one processor;
enabling said at least one processor to evaluate said at least one signal to identify a connection protocol type of said wireless port from which said at least one signal was broadcast; and
instructing said at least one processor to select a connection protocol appropriate for establishing communication with said wireless port based on said connection protocol type thereof.

15. The workstation of claim 14, wherein said at least one storage medium further includes instructions for:
causing said at least one processor to instruct said at least one wireless network access device to initiate said connection protocol; and
if communication is established between said at least one wireless network access device and said wireless port, causing said at least one processor to communicate at least one security identifier to the local area network.

16. The workstation of claim 15, wherein said instructions cause said at least one processor to automatically communicate said at least one security identifier to the local area network.

17. The workstation of claim 15, wherein said instructions cause said at least one processor to query a user to enter said at least one security identifier through an input device of the workstation prior to causing said at least one processor to communicate said at least one security identifier to the local area network.

18. The workstation of claim 14, wherein said at least one storage medium further includes instructions for:
enabling said at least one processor to identify at least one signal that was broadcast by a wireless port of the local area network from a plurality of signals received by said at least one wireless network access device.

19. The workstation of claim 18, wherein said at least one storage medium further includes instructions for:
causing said at least one processor to select a single signal from a plurality of signals that were broadcast by wireless ports of the local area network.

* * * * *

UNITED STATES PATENT AND TRADEMARK OFFICE
CERTIFICATE OF CORRECTION

| | | |
|---|---|---|
| PATENT NO. | : 7,319,682 B2 | Page 1 of 1 |
| APPLICATION NO. | : 10/040553 | |
| DATED | : January 15, 2008 | |
| INVENTOR(S) | : Travis J. Parry | |

It is certified that error appears in the above-identified patent and that said Letters Patent is hereby corrected as shown below:

In column 9, line 24, in Claim 9, delete "ports" and insert -- port --, therefor.

Signed and Sealed this

Twenty-seventh Day of May, 2008

JON W. DUDAS
*Director of the United States Patent and Trademark Office*